United States Patent
Krivenkov et al.

(10) Patent No.: US 12,496,948 B2
(45) Date of Patent: Dec. 16, 2025

(54) ARMREST ELEMENT

(71) Applicant: GRAMMER Aktiengesellschaft, Ursensollen (DE)

(72) Inventors: Konstantin Krivenkov, Amberg (DE); Rohansinh Komalsinh Solanki, Maharashtra (IN); Hariom Anantrao Thakare, Maharashtra (IN); Shiju Surendran, Kerala (IN); Sagar Rambhau Mete, Maharashtra (IN)

(73) Assignee: GRAMMER Aktiengesellschaft, Ursensollen (DE)

( * ) Notice: Subject to any disclaimer, the term of this patent is extended or adjusted under 35 U.S.C. 154(b) by 295 days.

(21) Appl. No.: 18/306,537

(22) Filed: Apr. 25, 2023

(65) Prior Publication Data

US 2023/0356639 A1 Nov. 9, 2023

(30) Foreign Application Priority Data

May 4, 2022 (DE) ..................... 10 2022 110 946.1

(51) Int. Cl.
*B60N 2/75* (2018.01)
(52) U.S. Cl.
CPC .................. *B60N 2/793* (2018.02)
(58) Field of Classification Search
CPC .......... B60N 2/787; B60N 2/79; B60N 2/797; B60N 2/793
See application file for complete search history.

(56) References Cited

U.S. PATENT DOCUMENTS

| | | | | |
|---|---|---|---|---|
| 5,284,314 A * | 2/1994 | Misaras | ................ | B60N 3/102 297/188.17 |
| 7,258,381 B2 * | 8/2007 | Sturt | ........................ | B60R 7/04 296/37.7 |
| 8,061,671 B2 * | 11/2011 | Mahaffy | ................. | B60N 2/79 248/222.12 |
| 8,979,190 B2 * | 3/2015 | Madrigal | ............... | A47C 7/705 297/161 |
| 9,840,826 B2 * | 12/2017 | Huber | .................... | B60K 35/20 |

(Continued)

FOREIGN PATENT DOCUMENTS

| | | |
|---|---|---|
| DE | 69906461 | 10/2003 |
| DE | 102012010666 | 12/2013 |
| DE | 102020110772 | 4/2021 |

OTHER PUBLICATIONS

Official Action (no English translation available) for Germany Patent Application No. 102022110946.1, dated Sep. 29, 2022, 4 pages.

(Continued)

*Primary Examiner* — Philip F Gabler
(74) *Attorney, Agent, or Firm* — Sheridan Ross P.C.

(57) ABSTRACT

The invention relates to an armrest element of a seat, in particular of a vehicle seat, having a base body, the armrest element having at least one first connection interface of predetermined design to which an exchangeable extension module having a second connection interface of predetermined design can be fixed, the first connection interface and the second connection interface being designed in such a way that at least one positive connection between the first connection interface and the second connection interface is made possible.

20 Claims, 10 Drawing Sheets

(56) References Cited

U.S. PATENT DOCUMENTS

| | | | | |
|---|---|---|---|---|
| 10,259,356 | B2* | 4/2019 | Lehman | B60N 3/103 |
| 10,939,765 | B1* | 3/2021 | Reily | A47C 7/54 |
| 11,103,095 | B2* | 8/2021 | Martinez | A47G 23/0641 |
| 2022/0160132 | A1* | 5/2022 | Walter | A47C 7/546 |
| 2023/0356638 | A1* | 11/2023 | Krivenkov | B60N 2/767 |
| 2023/0356639 | A1* | 11/2023 | Krivenkov | B60N 2/24 |

OTHER PUBLICATIONS

Official Action for Germany Patent Application No. 102022110946.1, dated Sep. 16, 2025, 7 pages.

* cited by examiner

ARMREST ELEMENT

CROSS REFERENCE TO RELATED APPLICATION

This application claims the benefit of German Patent Application No. 10 2022 110 946.1, filed May 4, 2022, the contents of which are incorporated herein by reference in their entirety.

FIELD

The invention relates to an additional module for an armrest element of a seat, in particular a vehicle seat. Furthermore, the invention relates to a vehicle seat with an armrest element.

BACKGROUND

Such armrest elements are used, for example, in commercial vehicles such as tractors, forklifts, construction machinery and special vehicles. In such vehicles, the space available around the seat is often limited. Due to the lack of storage options elsewhere, there is a need to provide storage devices, holding devices and the like on the seat. Furthermore, it is desirable for various control and/or display devices to be attached directly to the seat, as this means that when the seat is deflected, there is as little relative movement as possible between the occupant's hand and the control and/or display devices due to the ground being driven over. The integration of such devices requires a wide variety of designs for the armrest element, depending on the customer's wishes. This means a great deal of effort for the manufacturers. In addition, it may be desirable to retrofit existing vehicle seats or armrests with such devices.

It is therefore the object of the present disclosure to provide an armrest element which solves the problems mentioned at the beginning.

SUMMARY

The object is solved by an armrest element according to the features described herein.

The main idea of the invention is an armrest element of a seat, in particular of a vehicle seat, with a base body, wherein the armrest element has at least one first connection interface of predetermined design to which an exchangeable extension module with a second connection interface of predetermined design can be fixed, wherein the first connection interface and the second connection interface are designed in such a way that at least one positive connection is made possible between the first connection interface and the second connection interface.

Preferably, at least one positive connection is provided between the first connection interface and the second connection interface.

By means of such a first connection interface of predetermined design, which is compatible with a corresponding second connection interface of predetermined design, a plurality of different extension modules can be arranged on the armrest element. The extension modules only need to have a second connection interface and can thus be arranged on the armrest without further ado. This results in a modular armrest that can be adapted to a variety of applications. The connection between the first connection interface and the second connection interface is a direct connection, as the two interfaces are directly adjoined.

Preferably, the armrest element extends along a longitudinal axis (X), a width axis (Y) and a height axis (Z). The armrest element can advantageously be arranged on a seat. It is advantageous that an inclination adjustment device is provided by means of which the inclination of the armrest relative to the seat can be adjusted. Accordingly, due to the inclination to be adjusted, the longitudinal axis and, if applicable, the height axis of the armrest element can include an angle of inclination with the longitudinal axis or the height axis of the seat. The width axis of the armrest element can correspond to the width axis of the seat or enclose a preferably adjustable angle with it.

According to an advantageous embodiment, the armrest element comprises a support element which is arranged on the base body. Advantageously, the base body is arranged along the height axis under the support element. Preferably, the support element comprises or is an upholstery element. However, it is also conceivable that the base body itself forms a support surface. The support surface or support element provides the occupant with a surface to rest the arm on. An upper side of the base body includes the support surface or faces the support element. A lower side of the base body is opposite to the upper side.

Advantageously, an operating element for adjusting the inclination of the armrest element is arranged on the upper side of the base body. This operating element can be a rotating wheel or cylinder element.

Preferably, the base body comprises an outer long side extending along a longitudinal axis, a front side extending along a width axis and a rear side extending along the width axis. The front side is spaced from and substantially opposite the rear side along the longitudinal axis. Advantageously, in an installed state of the armrest element, the rear side is closer to the backrest than the front side. The outer long side is spaced along the width axis from an inner long side and is substantially opposite thereto. The inner long side faces an occupant.

According to an advantageous embodiment, a first connection interface is arranged on the front side of the base body and/or on the rear side of the base body.

A positive connection involves an action that occurs through the geometric contact of two active surfaces. The connection may have a clearance between the active surfaces and allows one or more degrees of freedom of movement. A positive connection may also involve the use of a connecting element, between two elements to be connected. Such a connecting element may be, for example, a screw, a pin, a rivet or the like.

Advantageously, the at least one positive connection between the first connection interface and the second connection interface is a detachable connection. This enables the interchangeability of the extension modules.

According to a further preferred embodiment, a first positive connection in the form of a fitting connection is provided between the first connection interface and the second connection interface. Preferably, the fitting connection is as free of play as possible. Preferably, one of the connection interfaces comprises a receptacle in which a connecting section of the further connection interface is received. The connecting section and the receptacle are thus substantially complementary to each other. The expression "essentially" is intended to take into account tolerance deviations of the two elements, which, however, do not impair the function or the receptacle of the connecting element.

Advantageously, the first connection interface comprises the connecting section and the second connection interface comprises the receptacle. However, it is also conceivable that the second connection interface comprises the connecting section and the first connection interface comprises the receptacle.

According to a further aspect of the invention, it is advantageous in that at least a second positive connection is provided between the first connection interface and the second connection interface. Advantageously, the second positive connection is a screw connection. However, other detachable positive connections are also conceivable.

Preferably, the receptacle of a connection interface and the connecting section of the further connection interface each have at least one first side wall. It is advantageous that the first side walls of the connection interfaces adjoin each other and each have aligned holes which enable the second positive connection. Advantageously, the holes are provided with an internal thread into which a screw can be screwed. Preferably, both the receptacle and the connecting section comprise two first side walls which are spaced apart along the width axis. Advantageously, a first side wall of the connecting section is in contact with a first side wall of the receptacle. In a state in which the connecting section is received in the receptacle, the two adjacent first side walls each have aligned holes which allow a second positive connection. This enables the extension module to be fixed to the base body on two sides by means of two second positive connections.

According to a further preferred embodiment, a guide connection is provided between the first connection interface and the second connection interface, the guide connection comprising a pin element and a receptacle. Such a guide connection facilitates the mounting of the extension module on the base body or the second connection interface on the first connection interface. The engagement of the pin element in the receptacle aligns the extension module relative to the base body, so that in a final position the holes in at least one of the first side walls are aligned. Accordingly, a preferred screw can be easily screwed in.

The guide connection is preferably arranged substantially centrally with respect to an extension of the first connection interface and the second connection interface along the width axis. Advantageously, the connecting section and the receptacle each have a second side wall which preferably extends substantially perpendicular to the first side walls. Advantageously, the second side wall connects the two first side walls. It is also conceivable that the second side wall is integrated into the base body or the extension module.

According to a further aspect of the invention, it is advantageous in that the first connection interface and/or the second connection interface is provided on an adapter element arranged on the base body or the extension module. Preferably, the first connection interface is integrally or one-piece formed by the base body. Preferably, the second connection interface is formed in one piece or integrally by the extension module. A one-piece design is understood here and also further on to mean that all sections are made from a single and uniform part. An integral design is understood here and in the following to mean that all sections, although not made from a single and uniform part, are not only firmly but also so intimately connected to one another that they do not appear as several components joined to one another and in any case can no longer be detached from one another without being destroyed in the process. The above-mentioned advantageous one-piece or integrally designs of the first and/or second connection interface have the advantage of simple manufacture and also a stable or robust design of both the connection interfaces and the base body or extension module.

According to a further advantageous embodiment, the first connection interface and/or the second connection interface is provided on an adapter element. Advantageously, the adapter element is arranged on the base body or the extension module. Preferably, the first connection interface is provided on an adapter element which is arranged on the base body. By means of such an advantageous adapter element, already existing armrest elements or base bodies can be equipped with a first connection interface and thus be extended with a multitude of possible extension modules. It would also be conceivable that the second connection interface is provided on an adapter element which is arranged on an extension module. By means of such an advantageous adapter element, already existing extension modules can be attached to a base body with a first connection interface. The said adapter elements can be attached to the base body or the extension module by means of a form-fitting or also a material-fitting connection. Screw connections, bonded connections, welded connections and other suitable connections can be considered.

According to a further preferred aspect of the invention, the at least one extension module is or comprises an active extension module. Preferably, the active extension module is selected from the group comprising: an input and/or output device, a joystick, a steering wheel, a pushbutton and/or switching element, a touch screen, a display device or combinations of the aforementioned elements. Of course, further similar active extension modules are also conceivable. Thus, any input and/or output devices can be easily arranged mechanically on the base body. It is advantageous that the base body comprises connection possibilities for the power supply and/or for data lines for the respective active extension module. Advantageously, the active extension module can be arranged on the front side of the base body.

According to a further advantageous embodiment, the at least one extension module is or comprises a passive extension module. Preferably, the passive extension module is selected from the group comprising: a storage element, a holder element, for example a cup holder, a hook element, a pocket, a net, an ashtray, an additional cushion or combinations of the aforementioned elements. Of course, other similar passive extension modules are also conceivable. Such passive extension modules can be arranged on the front side as well as on the rear side of the base body.

According to a further aspect of the invention, it is advantageous in that at least one further extension module can be arranged on the outer long side of the base body. Advantageously, the at least one further extension module is an active extension module, a passive extension module or a combination of an active and a passive extension module. The active extension module may be selected from the group comprising: an input and/or output device, a joystick, a steering wheel, a pushbutton and/or switching element, a touch screen, a display device or combinations of the aforementioned elements. Preferably, the passive extension module is selected from the group comprising: a storage element, a holder element, a hook element, a bag, a net, an ashtray, an additional pad or combinations of the aforementioned elements. Of course, further similar active or passive extension modules are also conceivable.

According to a further preferred embodiment, a third connection interface of predetermined design is provided, which is arranged on the outer long side of the base body and serves to fasten the further extension module. Preferably, the at least one further extension module has a fourth connection interface of predetermined design which is compatible with the third connection interface.

According to a further preferred embodiment, the third connection interface comprises an adapter element on which detent openings are provided into which at least one detent projection of an extension module can engage. The adapter element can advantageously be designed as a multifunctional rail.

According to a further preferred embodiment, the further extension module is a net storage element. The net can advantageously be of elastic design. Preferably, the net storage element is arranged on the base body by means of at least one positive connection. Preferably, the positive connection is a screw connection.

According to a further preferred embodiment, the at least one extension module and/or the at least one further extension module is designed in such a way that at least one additional extension module can be arranged thereon. The at least one extension module and/or the at least one further extension module are or comprise a fifth connection interface. The fifth connection interface is thus an indirect interface. The additional extension module can preferably be arranged on the at least one extension module or the at least one further extension module by a non-positive connection. The fifth connection interface may, for example, represent at least one opening, at least one protrusion or the like, in or on which clamping devices of the additional extension module may engage. However, such an opening could also be an opening of the passive extension module, for example the storage element or cupholder. Such an additional extension module could be, for example, a holding device for a smartphone or mobile phone.

The task is also solved by a vehicle seat with an armrest element. The vehicle seat can be equipped with all the features described above in the context of the armrest element, either individually or in combination with each other, and vice versa.

BRIEF DESCRIPTION OF THE DRAWINGS

Further advantages, objectives and features of the present invention are explained with reference to the following description of the accompanying figures. Similar components may have the same reference signs in the various embodiments.

Show in the figures.

DETAILED DESCRIPTION

In the figures, identical components are to be understood with the corresponding reference signs. For the sake of clarity, some components may not have a reference sign in some figures, but have been designated elsewhere.

FIGS. 1 to 8e show an armrest element 1 of a seat, in particular of a vehicle seat 100, with a base body 2, wherein the armrest element 1 has at least one first connection interface 3 of predetermined design, to which an exchangeable extension module 4 with a second connection interface 5 of predetermined design can be fixed, wherein the first connection interface 3 and the second connection interface 5 are designed in such a way that at least one positive connection is made possible between the first connection interface 3 and the second connection interface 5. At least one positive connection is provided between the first connection interface 3 and the second connection interface 5. By means of such a predefined, preferably even standardised connection interface, a multitude of different extension modules 4 can be arranged on the armrest element 1.

Figure 10:
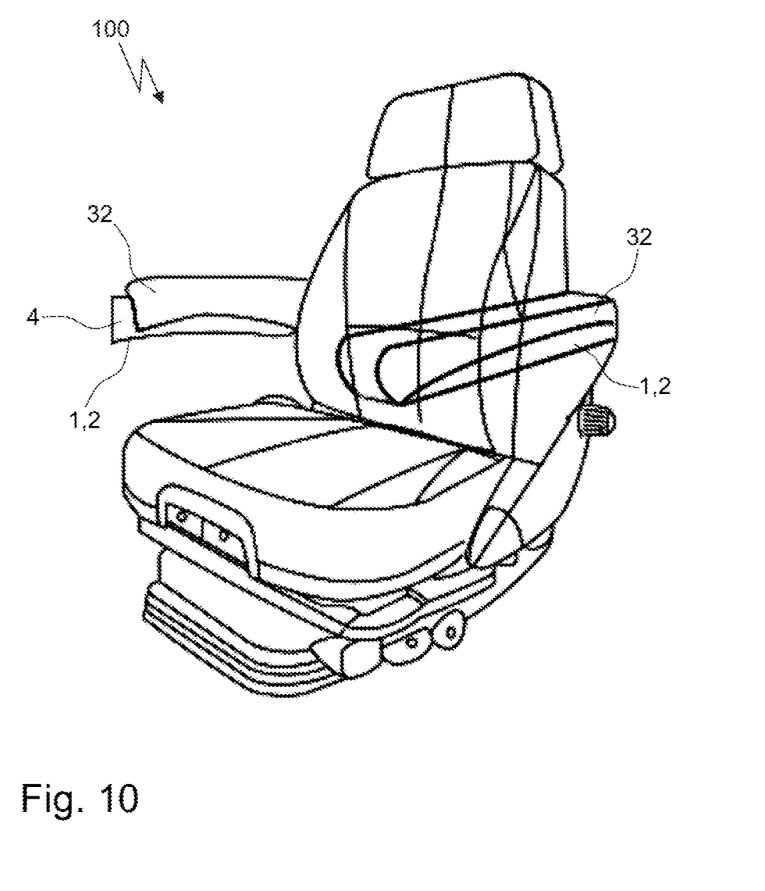
FIG. 10 a vehicle seat with the armrest element.

The armrest element 1 extends along a longitudinal axis X, a width axis Y and a height axis Z. The armrest element 1 can be arranged on a seat 100. This is shown in FIG. 10. For this purpose, a fastening element 29 is provided, which is attached to the base body 2. A tilt adjustment device can be provided by means of which the tilt of the armrest element 1 relative to the seat 100 can be adjusted. The inclination adjustment device can be operated with an operating element 30 in the form of a rotatably arranged cylinder element. This operating element 30 is arranged on an upper side 2b of the base body 2. The base body 2 has a recess 31 for this purpose.

According to an advantageous embodiment, the armrest element 1 comprises a support element 32 which is arranged on the base body 2. The base body 2 is arranged along the height axis Z under the support element 32. The support element 32 comprises or is a cushioning element. The support element 32 provides the occupant with a surface to rest the arm on. An upper side 2a of the base body 2 faces the support element 32. The upper side 2b of the base body 2 is opposite to the upper side 2a. The base body 2 includes a lower section from which side walls 11 extend along the height axis Z. On the upper side 2a, the base body 2 is open and covered by the support element 32.

The base body 2 comprises an outer long side 6 extending along a longitudinal axis X. The outer long side 6 is spaced along the width axis Y from an inner long side 6a and is substantially opposite the latter. The inner long side 6a faces an occupant. Furthermore, the base body 2 comprises a front side 7 extending along the width axis Y and a rear side 8 extending along the width axis Y. The front side 7 is spaced from the rear side 8 along the longitudinal axis X and is substantially opposite thereto.

According to the embodiments shown in the figures, a first connection interface 3 is provided both on the front side 7 of the base body 2 and on the rear side 8 of the base body 2. Of course, embodiments are also envisaged in which the first connection interface 3 is provided on the front side 7 of the base body 2 or on the rear side 8 of the base body 2.

A first positive connection in the form of a fitting connection is provided between the first connection interface 3 and the second connection interface 5. The fitting connection comprises a connection interface 3, 5 designed as a receptacle 9. In the embodiments shown, the second connection interface 5 is designed as a receptacle 9. Furthermore, the first connection interface 3 is designed as a connecting section 10. The connecting section 10 can be pushed into the receptacle 9 and is received by it. The first connection interface 3 and the second connection interface 5 are thus compatible.

The first connection interface 3 is formed integrally or in one piece by the base body 2. Likewise, the second connection interface 5 is formed integrally or in one piece by the extension module 4. However, it would also be conceivable for the first connection interface 3 and/or the second connection interface 5 to be provided on an adapter element 37. The adapter element 37 could then be arranged on the base body 2 or the extension module 4.

In a first connection interface 3, which is arranged on the front side 7 of the base body 2, the connecting section 10 is essentially rectangular in shape. Of course, other shapes such as a triangular shape or any other polygonal shape would also be conceivable. The connecting section 10 comprises two first side walls 11 spaced along the width axis Y, which extend along the longitudinal axis X and the height axis Z. The first side wall 11 is a second side wall 33. A second side wall 33, which extends substantially along the width axis Y and the height axis Z, connects the two first side walls 11. The two first side walls 11 and the second side wall 33 are arranged on a plate-like element 42 or are formed integrally or in one piece therewith.

In a second connection interface 5 compatible with this first connection interface 3, the receptacle 9 is also substantially rectangular in shape and comprises two first side walls 11 extending along the longitudinal axis X and the height axis Z. Furthermore, a second side wall 33 integrated in the extension module 4 is provided (not visible in the views), which extends along the width axis Y and the height axis Z and connects the two first side walls 11. The receptacle 9 also comprises at least the first two side walls 11, and preferably also the second side wall 33, which are arranged on the receptacle 9 or are formed integrally or in one piece therewith.

Furthermore, a guide connection 13 is provided between the first connection interface 3 and the second connection interface 5. This guide connection 13 comprises a pin element 14 and a receptacle 15. In the case of a first connection interface 3, which is arranged on the front side 7 of the base body 2, the receptacle 15 is provided in the second side wall 33 of the connecting section 10. The receptacle 15 is arranged substantially centrally along the width axis Y. The pin element 14 is provided on the second side wall 33 of the second connection interface 5.

When the extension module 4 is pushed onto the base body 5, the connecting section 10 enters the receptacle 9. The guide connection 13 correctly positions the connecting section 10 relative to the receptacle 9. The guide connection 13 thus facilitates the assembly of a corresponding extension module 4. In an end position, the plate-like element 42 of the connecting section 10 lies against the plate-like element 42 of the receptacle 9, wherein the plate-like element 42 of the connecting section 10 lies along the height axis Z above the plate-like element 42 of the receptacle 9. Further, the first side walls 11 of the connecting section 10 abut the first side walls 11 of the receptacle 9, the first side walls 11 of the connecting section 10 lying along the width axis Y within (i.e. closer to an imaginary centre line) the first side walls 11 of the receptacle 9. The first side walls 11 of the connecting section 10 and the first side walls 11 of the receptacle 9 each have aligned holes 12 which enable the second positive connection. These holes 12 are preferably threaded so that a screw can be screwed in. This second positive connection secures the extension module 4 to the base body 2.

Figure 1:
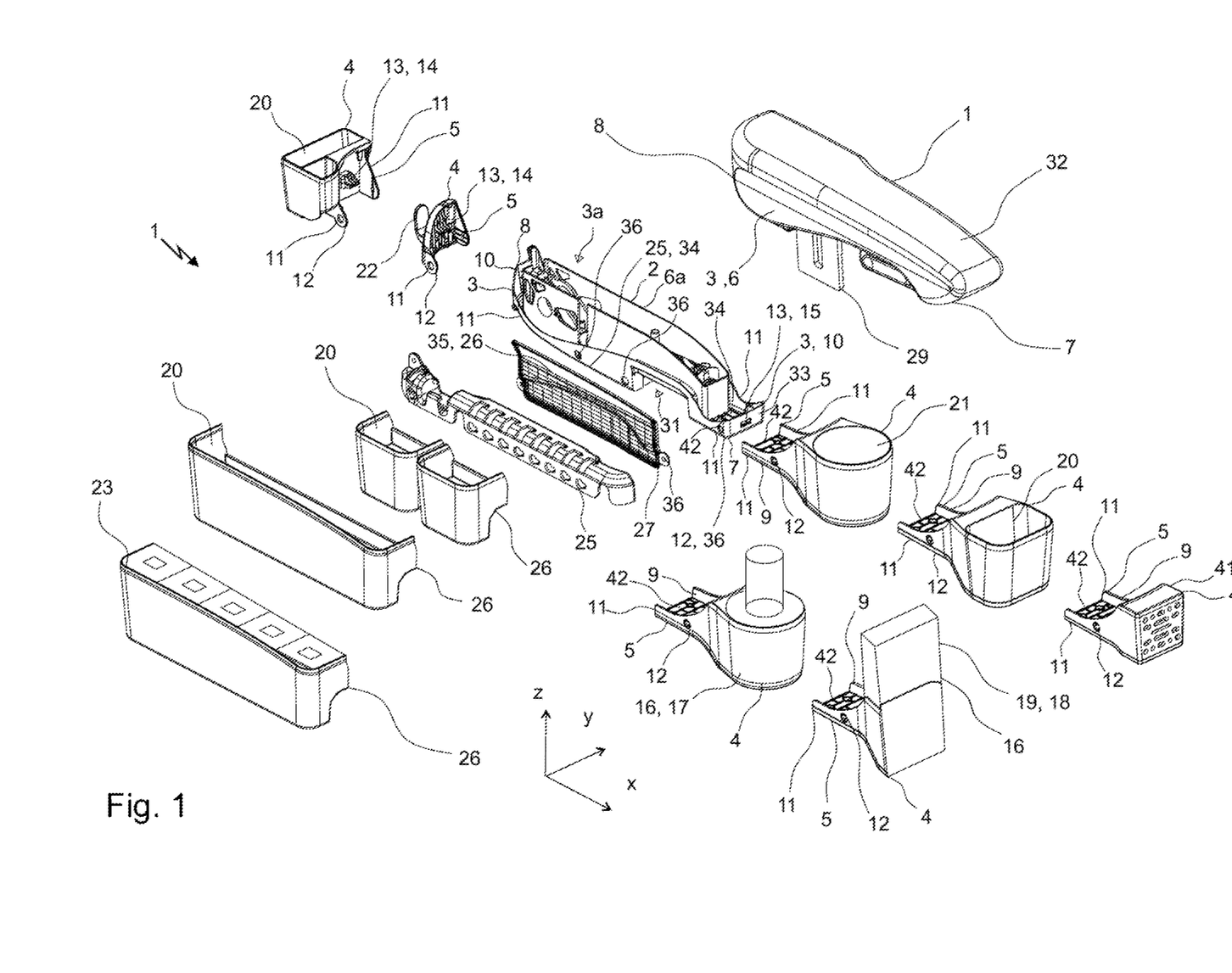
FIG. 1 an exploded view of an armrest element according to one embodiment.

It can be seen, among other things, from FIG. 1 that the first side walls 11 of the connecting section 10 and of the receptacle 9 have a curved course along the height axis Z. If the extension module 4 is located on the base body 2, there is thus a kind of recess into which the downwardly extending section of the support element 32 can be inserted.

A first connection interface 3, which is provided on the rear side 8 of the base body 2, is formed as a connecting section 10. The connecting section 10 comprises first side walls 11 which are integrated in the base body 2. The second connection interfaces 5 compatible therewith also comprise first side walls 11. These side walls 11 extend forward along the longitudinal axis X.

The receptacle 9 is substantially trapezoidal or parabolic in shape. Here too, the first side walls 11 of the receptacle 9 embrace the first side walls 11 of the connecting section 10 when the extension module 4 is guided onto the base body 2. A guide connection 13 with a pin element 14 (shown in FIG. 6e) and a receptacle 15 is also provided, whereby the pin element 14 is arranged in the second connection interface 5 designed as a receptacle 15. In the case of the connection interfaces 3, 5 provided for the rear side 8, it may be advantageous for only one opposite pair of first side walls 11 to have a hole 12 for a second positive connection. These side walls 11 face the outer long side 6. A screw can be conveniently screwed in here. The other pair of opposite side walls 11 face the inner long side 6a. Here, in the case of an armrest element 1 mounted on a seat 100, the backrest can make it difficult to insert or remove a screw.

Furthermore, at least one further extension module 24 can be arranged on the outer long side 6 of the base body 2.

The at least one extension module 4 can be an active extension module 4, a passive extension module 4 or a combination of an active and a passive extension module 4. The at least one further extension module 24 can also be an active extension module 24, a passive extension module 24 or a combination of an active and a passive extension module 24.

An active extension module 4, 24 may be an input and/or output device 16, a joystick 17, a steering wheel, a push-button and/or switching element 23, a touch screen 18, a display device 19 or a combination of the aforementioned elements. A passive extension module 4, 24 may be a storage element 20, a holder element 21, for example a cup holder, a hook element 22, a bag, a net, an ashtray, an extra pad or combinations of the aforementioned elements. FIG. 1 shows some of these active and passive extension modules 4, 24.

For fastening the further extension module 24 to the outer long side 6 of the base body 2, a third connection interface 25 of predetermined design is provided, which is arranged or formed on the outer long side 6 of the base body 2. The at least one further extension module 24 comprises a fourth connection interface 26 of predetermined design, which is compatible with the third connection interface 25.

The third connection interface 25 can be a single section 34 of a side wall of the base body 2. In this side wall 34, at least one hole 36 is provided, preferably two holes 36, more preferably three holes 36. Preferably, these holes 36 are provided with a thread. A fourth connection interface 26 has a side wall 35 correspondingly compatible with the section 34 of a side wall of the base body 2. This side wall 35 also has corresponding holes 36 which, in a state in which the further extension module 24 is arranged on the base body 2, are aligned with the holes 36 of the base body 2, so that at least one positive connection, preferably a screw connection, can be produced. An extension module 24 which can be arranged in this way is, for example, a net storage element 27. This can be seen in FIG. 1 and in FIGS. 4a to 4e.

The third connection interface 25 can further comprise an adapter element 37, which can be designed as a multi-functional strip. The adapter element 37 comprises a plurality of detent openings 38 into which at least one detent projection 39 can engage. This is clearly shown in FIG. 9b. The adapter element 37 can be attached to the base body 2 using at least one hole 36, preferably two holes 36, more preferably three holes 36.

The at least one extension module 4 and/or the at least one further extension module 24 is designed in such a way that at least one additional extension module 28 can be arranged thereon. For this purpose, openings and/or projections can be provided, for example, which enable a non-positive connection, for example a clamp connection, with an additional extension module 28. Accordingly, the at least one extension module 4 and/or the at least one further extension module 24 are or comprise a fifth connection interface 40. Thus, many common additional extension modules 28 can be indirectly attached to the base body 2 by means of a non-positive connection. FIG. 2d shows, for example, an additional extension module 28 in the form of a holder for a smartphone. This holder is force-fitted in an extension module 4 in the form of a holder element/cupholder 21 by means of a clamping connection against the inner wall of the holder element/cupholder 21.

FIG. 1 shows an extension module 4, which is designed as an adapter module 41. The adapter module 41 has a front side with various holes 12, which are equipped with an internal thread. By means of these holes 12, various other elements can be attached to the adapter module 41.

FIGS. 2a to 8e show various combinations of extension modules 4 and further extension modules 24 in different views.

Figure 2A:
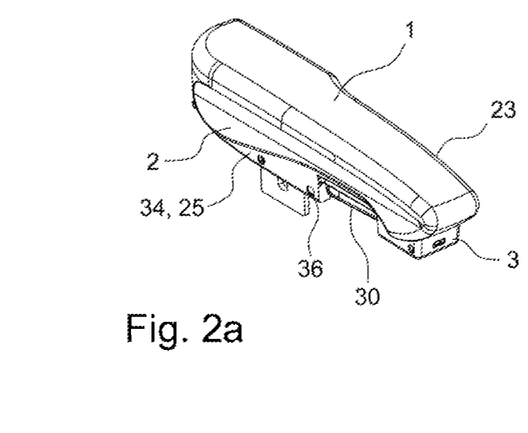
FIG. 2a an armrest element according to an embodiment.
Figure 3A:
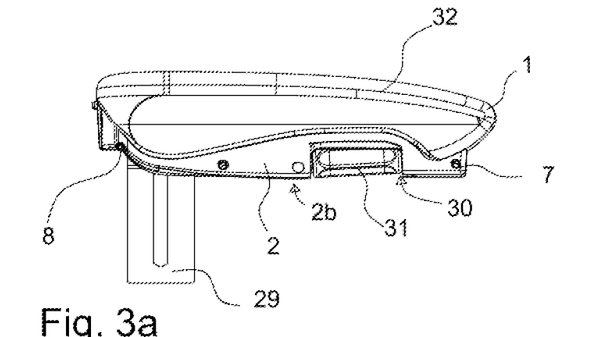
Figure 3B:
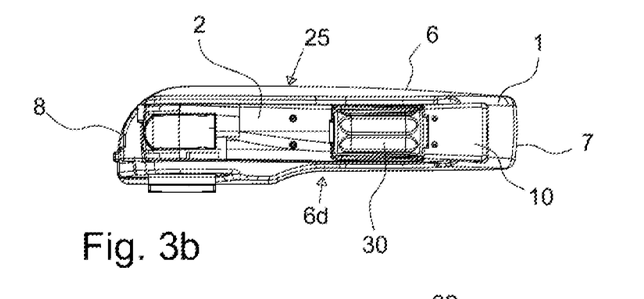
Figure 3C:
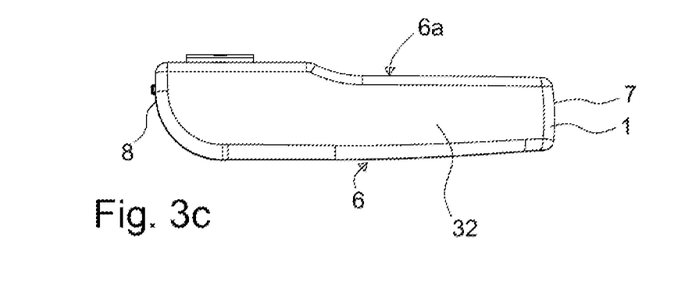
Figure 3D:
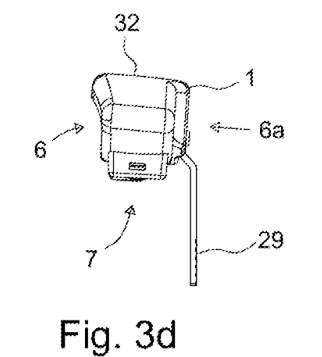
Figure 3E:
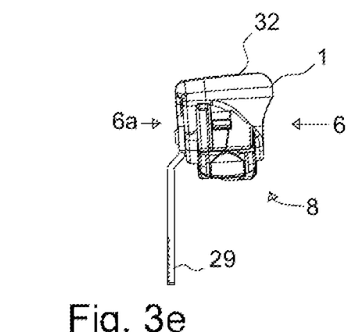

FIG. 2a shows a perspective view of an armrest element 1 with a first connection interface 3 and a third connection interface 25. FIGS. 3a to 3e show further views of such an armrest element 1. FIG. 3a is a side view, FIG. 3b a bottom view, FIG. 3c a top view, FIG. 3d a front view and FIG. 3e a rear view.

Figure 2B:
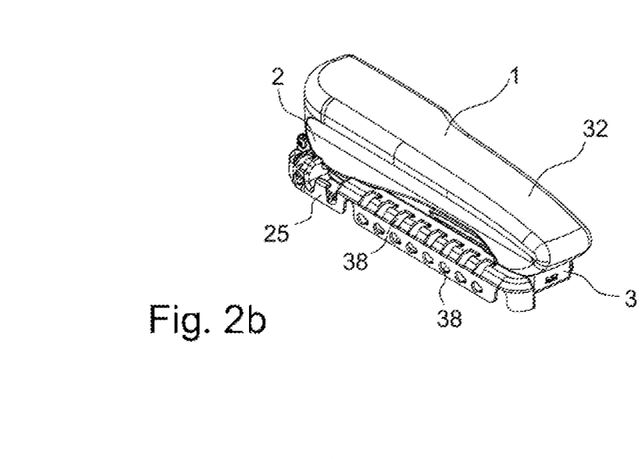
FIG. 2b an armrest element according to an embodiment.

FIG. 2b shows a perspective view of such an armrest element 1 with a third connection interface 25 comprising an adapter element 37.

Figure 2C:
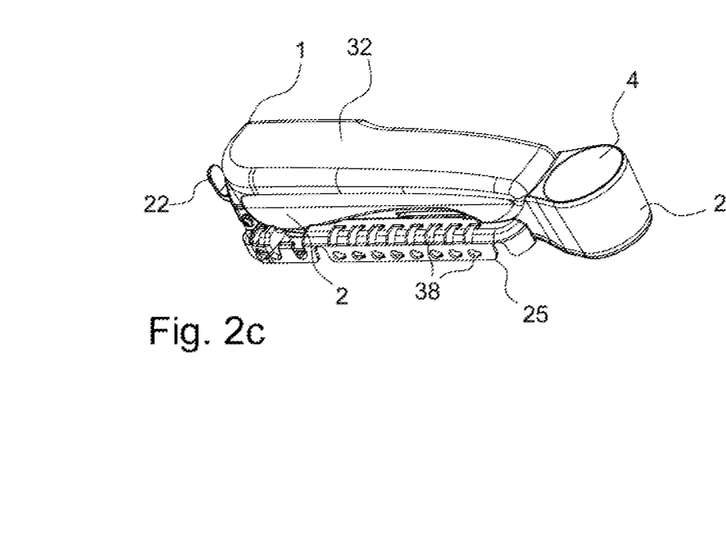
FIG. 2c an armrest element according to an embodiment.
Figure 2D:
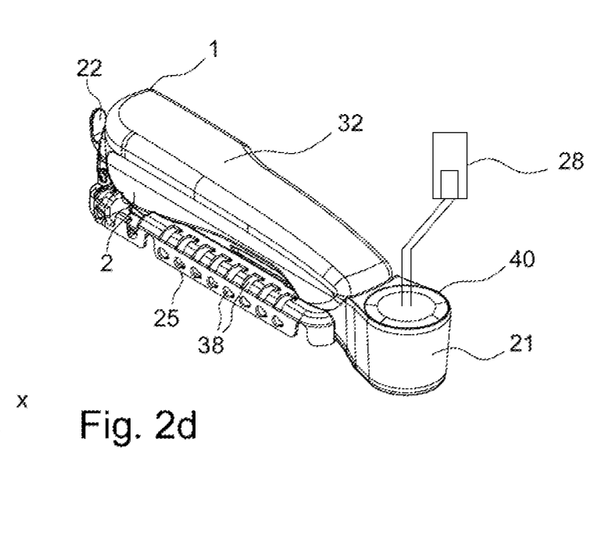
FIG. 2d an armrest element according to one embodiment
FIG. 3a-3e different views of an armrest element according to an embodiment.
Figure 5A:
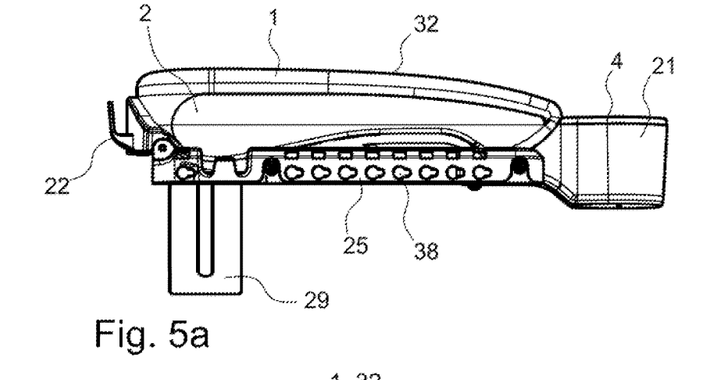
FIG. 5a-5e different views of an armrest element according to an embodiment.
Figure 5B:
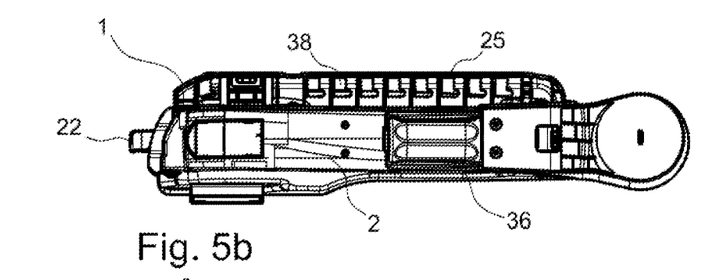
Figure 5C:
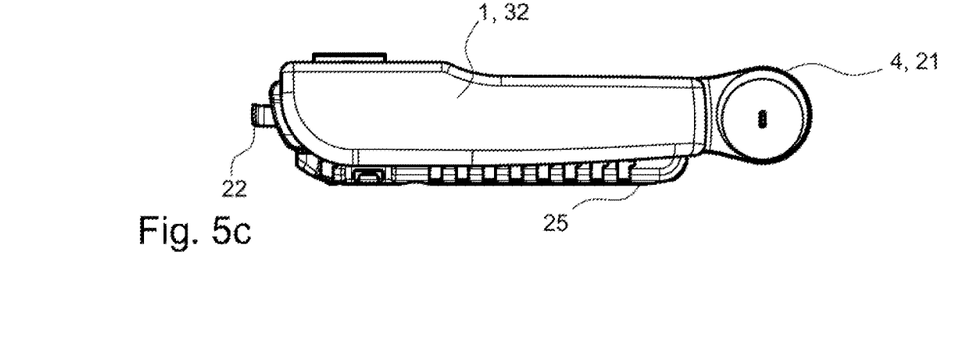
Figure 5D:
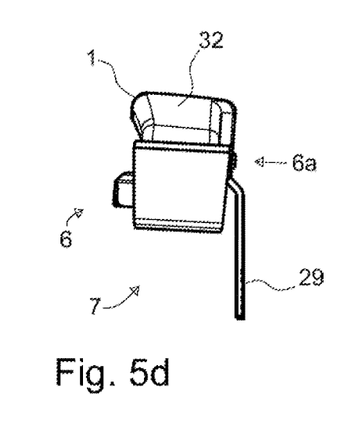
Figure 5E:
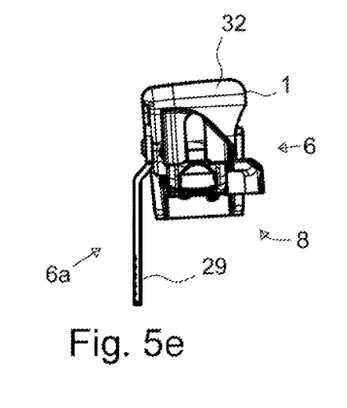

FIG. 2c is a perspective view of an armrest element 1 with an extension module 4 in the form of a cup holder or holder element 21, which is arranged on the front side 7 of the base body 2 by means of first and second connection interfaces 3, 5. An extension module 4 in the form of a hook element 22 is arranged on the rear side 8 of the base body 2 by means of first and second connection interfaces 3, 5. FIGS. 5a to 5e show further views of such an armrest element 1. FIG. 5a is a side view, FIG. 5b a bottom view, FIG. 5c a top view, FIG. 5d a front view and FIG. 5e a rear view.

Figures 4A, 4E:
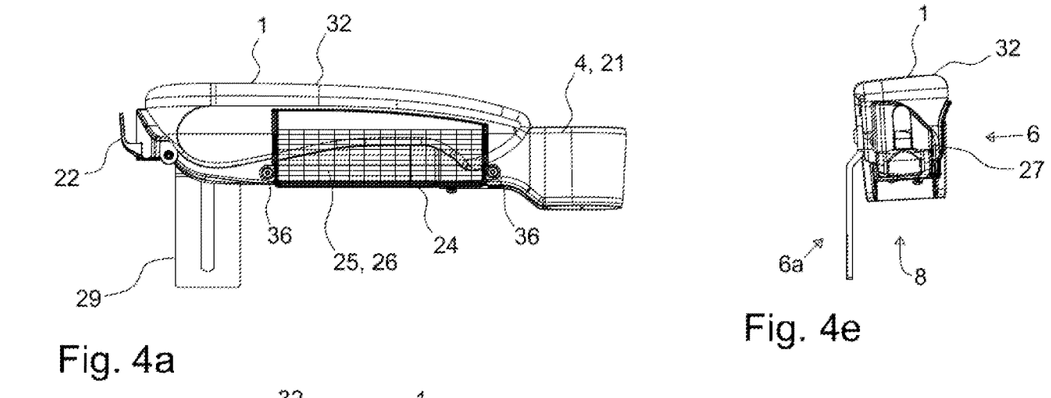
FIG. 4a-4e different views of an armrest element according to an embodiment.
Figure 4B:
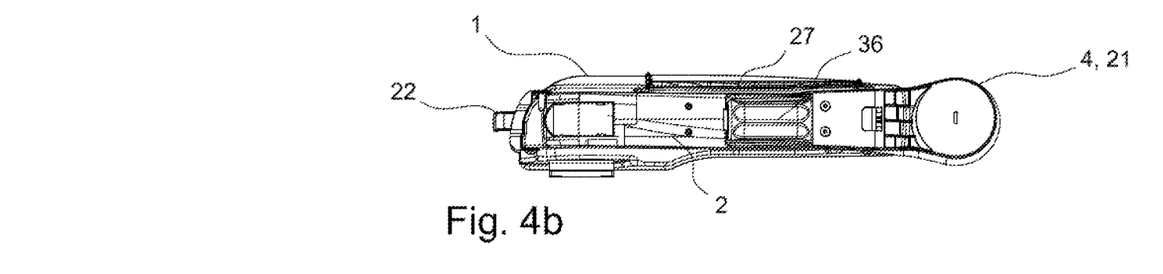
Figure 4C:
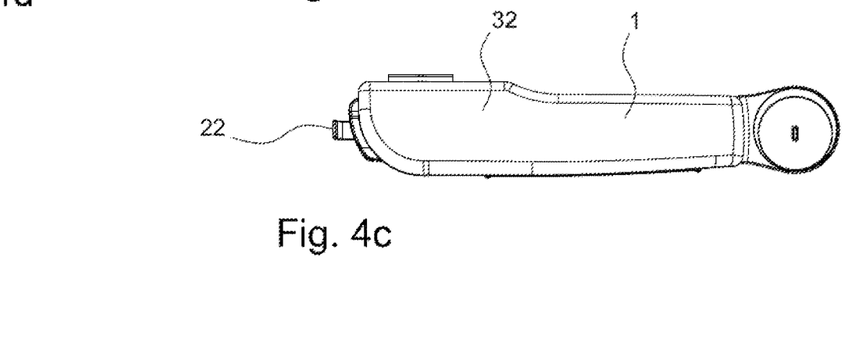
Figure 4D:
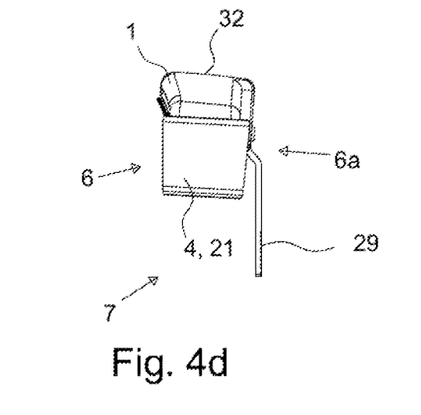

FIGS. 4a to 4e show views of an armrest element 1 on which a further extension module 24 in the form of a net storage element 27 is arranged. The net storage element 27 has a fourth connection interface 26, which is arranged on the third connection interface 25 of the base body 2. FIG. 4a is a side view, FIG. 4b a bottom view, FIG. 4c a top view, FIG. 4d a front view and FIG. 4e a rear view.

Figures 6A, 6C, 6E:
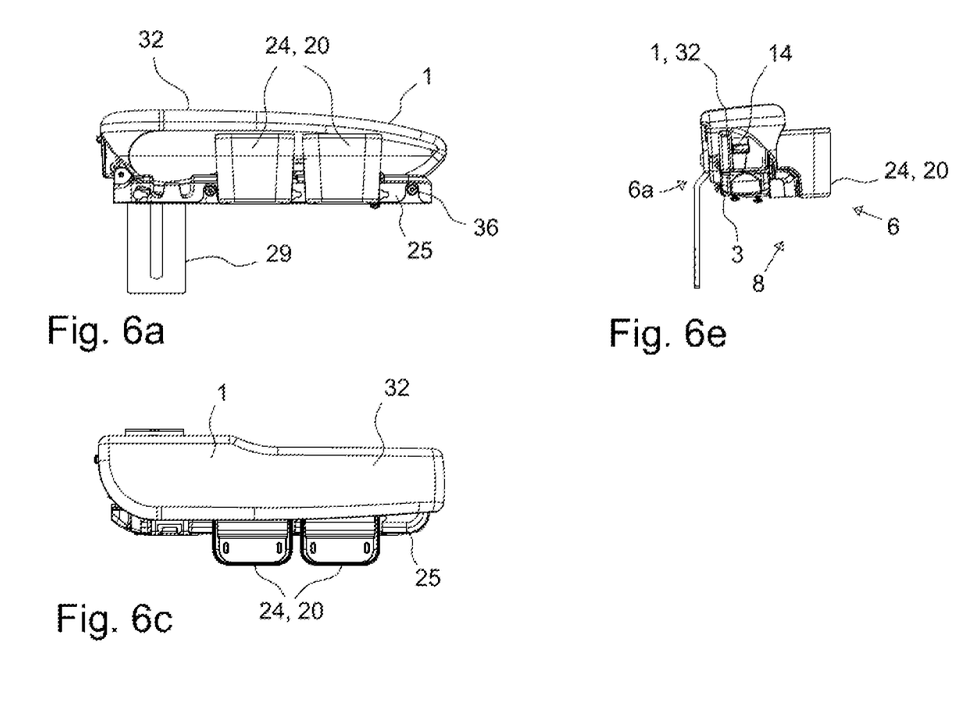
FIG. 6a-6e different views of an armrest element according to an embodiment.
Figure 6B:
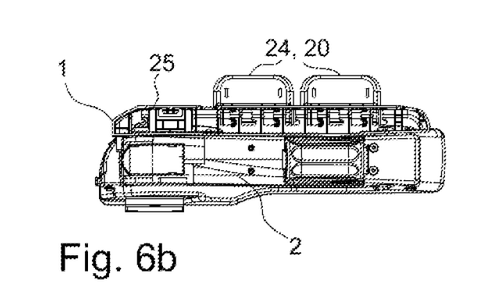
Figure 6D:
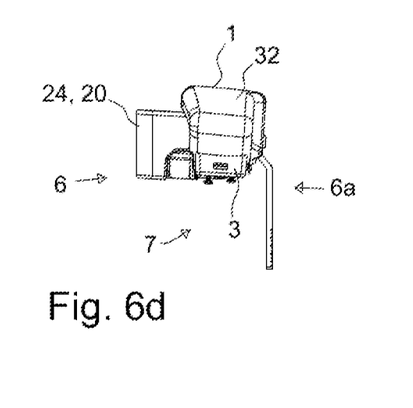
Figures 9A, 9C:
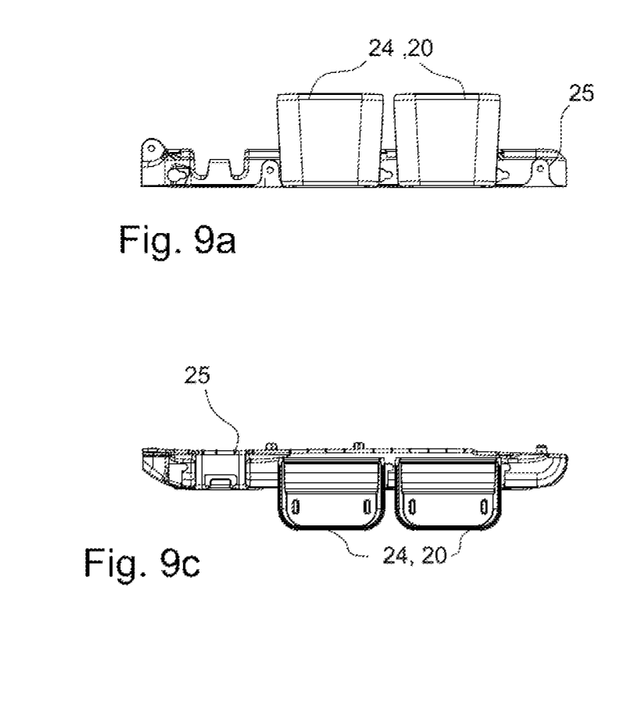
FIG. 9a-9e different views of a multifunctional rail according to one embodiment.
Figure 9B:
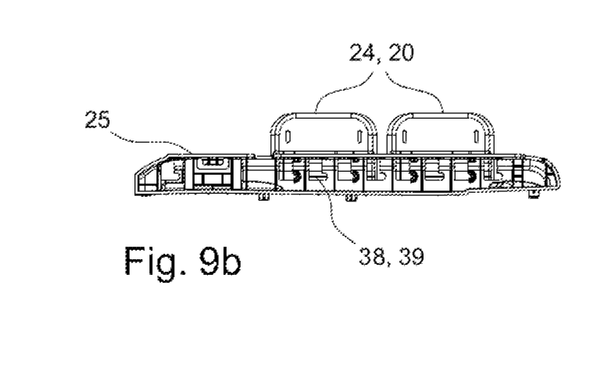
Figure 9D:
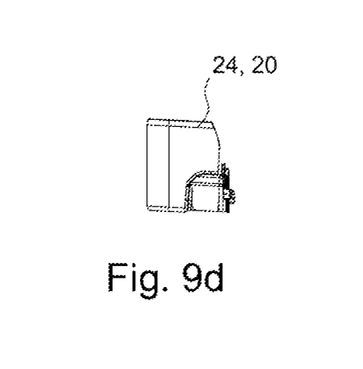
Figure 9E:
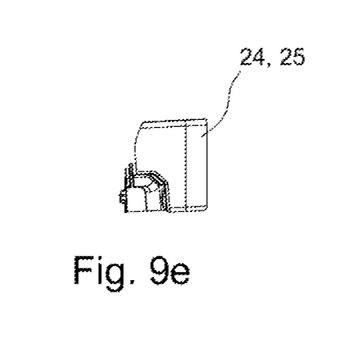

FIGS. 6a to 6e show views of an armrest element 1 on which two further extension modules 24 in the form of storage elements 20 are arranged. The two further extension modules 24 each have a fourth connection interface 26, which is arranged on the third connection interface 25 with an adapter element 37. The further extension modules 24 have at least one detent projection 39 which engages in detent openings 38 of the adapter element 37. FIG. 6a is a side view, FIG. 6b a bottom view, FIG. 6c a top view, FIG. 6d a front view and FIG. 6e a rear view. FIGS. 9a to 9e show only the two further extension modules 24 in the form of storage elements 20 and the adapter element 37. FIG. 9a is a side view, FIG. 9b a bottom view, FIG. 9c a top view, FIG. 9d a front view and FIG. 9e a rear view.

Figure 7A:
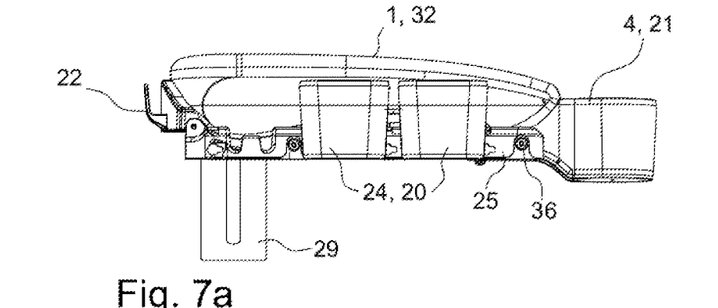
FIG. 7a-7e different views of an armrest element according to an embodiment.
Figure 7B:
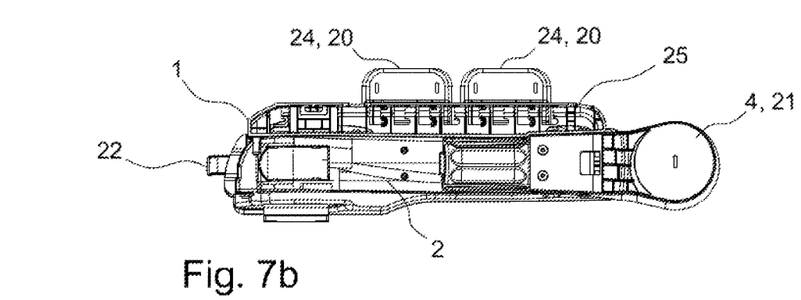
Figure 7C:
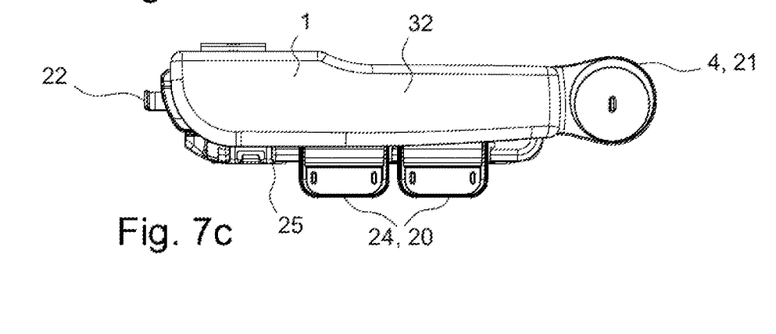
Figure 7D:
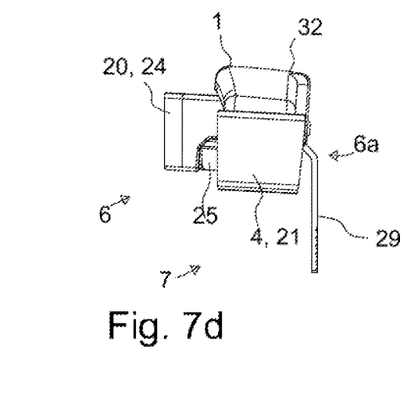
Figure 7E:
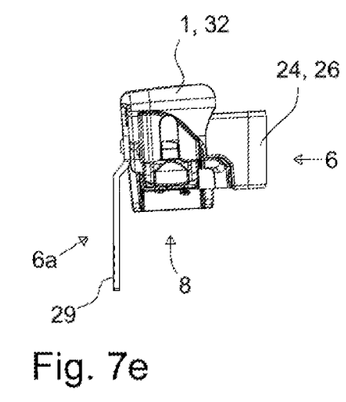

FIGS. 6a to 6e show views of an armrest element 1 which essentially corresponds to the armrest element 1 shown in FIGS. 6a to 6e. However, an extension module 4 in the form of a cup holder or holder element 21 is also provided, which is arranged on the front side 7 of the base body 2 by means of first and second connection interfaces 3, 5. An extension module 4 in the form of a hook element 22 is arranged on the rear side 8 of the base body 2 by means of first and second connection interfaces 3, 5. FIG. 7a is a side view, FIG. 7b a bottom view, FIG. 7c a top view, FIG. 7d a front view and FIG. 7e a rear view.

Figure 8A:
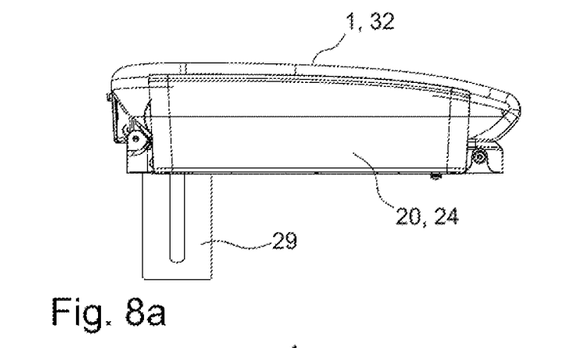
FIG. 8a-8e different views of an armrest element according to an embodiment.
Figure 8B:
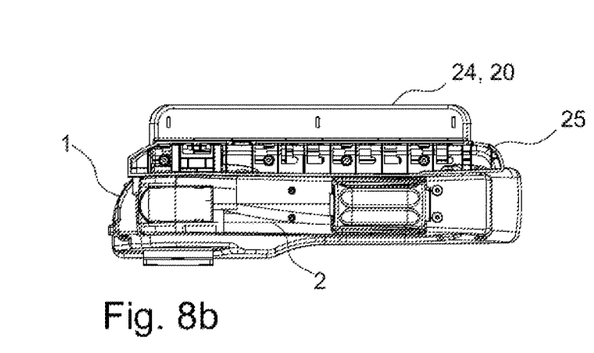
Figure 8C:
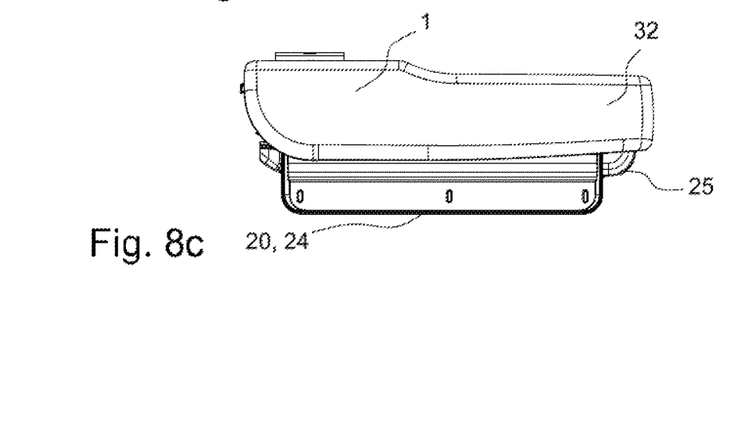
Figure 8D:
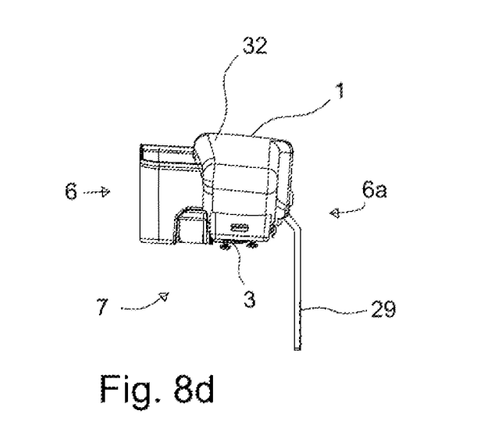
Figure 8E:
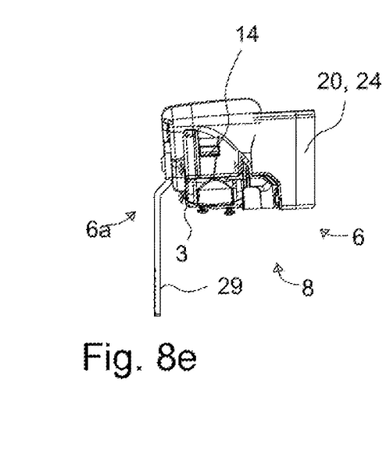

FIGS. 8a to 8e show views of an armrest element 1 which is substantially the same as the armrest element 1 shown in FIGS. 6a to 6e. However, instead of two further extension modules 24 in the form of storage elements 20, there is a further extension module 24 in the form of an elongated storage element 20. FIG. 8a is a side view, FIG. 8b a view from below, FIG. 8c a view from above, FIG. 8d a view from the front and FIG. 8e a view from behind.

All features disclosed in the application documents are claimed as essential to the invention, provided that they are individually or in combination new compared to the prior art.

LIST OF REFERENCE SIGNS

1 Armrest element
2 Base body
2b Upper side of the base body
2a Upper side of the base body
3 First connection interface
4 Extension module
5 second connection interface
6 outer long side
6a inner long side
7 Front side
8 Rear side
9 Receptacle
10 Connecting section
11 Side wall
12 Holes
13 Guide connection
14 Pin element
15 Receptacle
16 Input and/or output device
17 Joystick
18 Touch screen
19 Display device
20 Storage element
21 Holder element
22 Hook element
23 Pushbutton and/or switching element
24 Further extension module
25 Third connection interface
26 Fourth connection interface
27 Net storage element
28 Additional extension module
29 Fastening element 30 Operating element
31 Base body recess
32 Support element
33 Second side wall
34 Section of a side wall of the base body
35 Side wall
36 Holes
37 Adapter element
38 Detent openings
39 Detent projection
40 Fifth connection interface
41 Adapter module
42 Plate-like element
100 Seat
X Longitudinal axis
Y Width axis
Z Height axis

What is claimed is:

1. An armrest element of a vehicle seat, comprising:
a base body, the base body including:
an outer long side extending along a longitudinal axis;
an inner long side that faces an occupant in the vehicle seat;
a front side extending along a width axis direction; and
a rear side extending along the width axis direction, wherein the outer long side is spaced from the inner long side along the width axis direction;
a fastening element, wherein the fastening element attaches the base body to the vehicle seat;
a support element, wherein the support element is arranged on the base body and provides a surface on which an occupant can rest their arm;
a first connection interface on one of the front side or the rear side of the base body, wherein an exchangeable extension module having a second connection interface can be fixed to the first connection interface, and wherein the first connection interface and the second connection interface are designed in such a way that at least one positive connection is made possible between the first connection interface and the second connection interface; and
a third connection interface on the outer long side of the base body, wherein at least one further extension module having a fourth connection interface is compatible with the third connection interface.

2. The armrest element according to claim 1, wherein a first positive connection in the form of a fitting connection is provided between the first connection interface and the second connection interface, one of the first or second connection interfaces comprising a receptacle in which a connecting section of the first or second connection interfaces is accommodated.

3. The armrest element according to claim 2, wherein the first connection interface comprises the connecting section and the second connection interface comprises the receptacle.

4. The armrest element according to claim 2, wherein at least one second positive connection is provided between the first connection interface and the second connection interface, the at least one second positive connection is a screw connection, the receptacle of a connection interface and the connecting section of the further connection interface each have at least one first side wall, wherein the side walls of the connection interfaces adjoin each other and each have aligned holes that enable the second positive connection.

5. The armrest element according to claim 2, wherein a guide connection is provided as part of the first positive connection between the first connection interface and the second connection interface, the guide connection comprising a pin element and a receptacle.

6. The armrest element according to claim 1, wherein the first connection interface is formed integrally or in one piece as part of the base body or the extension module, wherein the second connection interface is formed integrally or in one piece as part of the extension module or the base body.

7. The armrest element according to claim 1, wherein the first connection interface and/or the second connection interface is provided on an adapter element, the adapter element being arranged on the base body or the extension module.

8. The armrest element according to claim 1, wherein the at least one extension module is or comprises an active extension module, wherein the active extension module is selected from the group comprising: an input and/or output device, a joystick, a steering wheel, a pushbutton and/or switching element, a touch screen, a display device or combinations of the aforementioned elements.

9. The armrest element according to claim 1, wherein the at least one extension module is or comprises a passive extension module, wherein the passive extension module is selected from the group comprising: a storage element, a holder element, a hook element, a pocket, a net, an ashtray, a pad or combinations of the aforementioned elements.

10. The armrest element according to claim 1, wherein the at least one further extension module is an active extension module, a passive extension module or a combination of an active and a passive extension module.

11. The armrest element according to claim 1, wherein the third connection interface comprises an adapter element on which detent openings are provided in which at least one detent projection of an extension module can engage.

12. The armrest element according to claim 1, wherein the at least one extension module and/or the at least one further extension module is configured in such a way that at least an additional extension module can be arranged thereon.

13. The armrest element according to claim 1, further comprising:
an inclination adjustment device by means of which a tilt of the armrest element relative to the vehicle seat can be adjusted, wherein the inclination adjustment device can be operated with an operating element in the form of a rotatably arranged cylinder element, wherein this operating element is arranged in a recess of an underside of the base body.

14. A vehicle seat with an armrest element, the armrest element comprising:
a base body, the base body including:
an outer long side extending along a longitudinal axis;
an inner long side that faces an occupant in the vehicle seat;
a front side extending along a width axis direction; and
a rear side extending along the width axis direction, wherein the outer long side is spaced from the inner long side along the width axis direction;
a fastening element, wherein the fastening element attaches the base body to the vehicle seat;
a support element, wherein the support element is arranged on the base body and provides a surface on which an occupant can rest their arm; and
a first connection interface on one of the front side or the rear side of the base body, wherein an exchangeable extension module having a second connection interface can be fixed to the first connection interface, wherein the first connection interface and the second connection interface are designed in such a way that at least one positive connection is made possible between the first connection interface and the second connection interface, wherein a first positive connection in the form of a fitting connection is provided between the first connection interface and the second connection interface, wherein one of the first and second connection interfaces includes a receptacle in which a connecting section of the further connection interface is accommodated, wherein at least one second positive connection is provided between the first connection interface and the second connection interface, wherein the receptacle and the connecting section each have at least one first side wall, wherein the first side walls of the connection interfaces adjoin each other and each have aligned holes that enable the second positive connection, and wherein the aligned holes are configured to receive a fastener.

15. The vehicle seat according to claim 14, wherein the at least one second positive connection is a screw connection, wherein a guide connection is provided between the first connection interface and the second connection interface, the guide connection comprising a pin element and a receptacle.

16. The vehicle seat according to claim 14, wherein the first connection interface is formed integrally or in one piece as part of the base body or the extension module, and wherein the second connection interface is formed integrally or in one piece as part of the extension module or the base body.

17. The vehicle seat according to claim 14, wherein the at least one extension module is or comprises an active extension module, wherein the active extension module is selected from the group comprising: an input and/or output device, a joystick, a steering wheel, a pushbutton and/or switching element, a touch screen, a display device or combinations of the aforementioned elements.

18. The vehicle seat according to claim 14, wherein the at least one extension module is or comprises a passive extension module, wherein the passive extension module is selected from the group comprising: a storage element, a holder element, a hook element, a pocket, a net, an ashtray, an additional pad or combinations of the aforementioned elements.

19. The vehicle seat according to claim 14, wherein the at least one extension module and/or the at least one further extension module is configured in such a way that at least an additional extension module can be arranged thereon.

20. The vehicle seat according to claim 14, further comprising:

an inclination adjustment device by means of which a tilt of the armrest element relative to the seat can be adjusted, wherein the inclination adjustment device can be operated with an operating element in the form of a rotatably arranged cylinder element, and wherein this operating element is arranged in a recess of an underside of the base body.

* * * * *